(12) United States Patent
Wirt (10) Patent No.: US 11,298,718 B1
(45) Date of Patent: Apr. 12, 2022

(54) FOG NOZZLE ADAPTER

(71) Applicant: Tekky, Orland Park, IL (US)

(72) Inventor: James C. Wirt, Orland Park, IL (US)

( * ) Notice: Subject to any disclaimer, the term of this patent is extended or adjusted under 35 U.S.C. 154(b) by 0 days.

(21) Appl. No.: 17/329,785

(22) Filed: May 25, 2021

(51) Int. Cl.
*B05B 15/65* (2018.01)

(52) U.S. Cl.
CPC .................................. *B05B 15/65* (2018.02)

(58) Field of Classification Search
CPC ....................................................... B05B 15/65
USPC ................................................. 239/289, 397
See application file for complete search history.

(56) References Cited

U.S. PATENT DOCUMENTS

| 5,330,234 | A | * | 7/1994 | Sweeny | ................ | B08B 15/002 |
| | | | | | | 285/148.18 |
| 5,927,759 | A | * | 7/1999 | Hyslop | ................ | B08B 15/002 |
| | | | | | | 285/9.1 |
| 10,082,233 | B2 | | 9/2018 | Lee | | |
| 2006/0103133 | A1 | | 5/2006 | Moretti et al. | | |

OTHER PUBLICATIONS

KR200464629Y1—a coupler for agriculture. Publisher: Google Patents. Author: see inventor name of document 1 in non-English characters. Translation of document 1—available at https://patents.google.com/patent/KR200464629Y1/en?oq=KR200464629Y1+Published not before Jul. 16, 2012 (publication date of translated original document).

* cited by examiner

*Primary Examiner* — Christopher S Kim
(74) *Attorney, Agent, or Firm* — Dixon IP Law; Jeffrey S. Dixon (57) ABSTRACT

A nozzle adapter for connecting corrugated tubing to a fog nozzle housing. The nozzle adapter comprises a channel body and a clamp, the channel body having a connector section and defining a flow channel extending through the channel body. The connector section comprises an outlet opening of the flow channel and is adapted and configured to removably connect to a piece of corrugated tubing. The clamp is operatively connected to the channel body and operable to clamp a fog nozzle housing so that an outlet end of the fog nozzle housing faces downstream toward the flow channel.

8 Claims, 7 Drawing Sheets

FOG NOZZLE ADAPTER

FIELD OF THE DISCLOSURE

The present disclosure relates to an adapter for directing fog emitted from a fog machine fog nozzle into corrugated tubing, such as corrugated plastic tubing of a type commonly used in vacuum cleaners.

SUMMARY

According to an aspect of the disclosure, a nozzle adapter for connecting corrugated tubing to a fog nozzle housing is disclosed. The nozzle adapter comprises a channel body and a clamp, the channel body having a connector section. In addition, the channel body defines a flow channel that extends through the channel body, the flow channel having an inlet opening formed in the channel body and an outlet opening formed in the channel body, the flow channel having an axis, the flow channel axis extending from the inlet opening to the outlet opening in a downstream direction and from the outlet opening to the inlet opening in a upstream direction. The flow channel axis defines longitudinal directions parallel to the flow channel axis and radial directions emanating perpendicularly from the flow channel axis. The connector section comprises the outlet opening and is adapted and configured to removably connect to a piece of corrugated tubing when an open end of the corrugated tubing is aligned with the outlet opening and the piece of corrugated tubing is pushed in the upstream direction into engagement with the connector section. The clamp is operatively connected to the channel body and operable to clamp a fog nozzle housing so that an outlet end of the fog nozzle housing faces downstream toward the flow channel.

According to another aspect of the disclosure, a method of using a fog nozzle adapter to direct fog emitted from a fog machine into a piece of corrugated tubing is disclosed. The fog nozzle adapter used in the method comprises a channel body and a clamp, the channel body having a connector section. The channel body defines a flow channel that extends through the channel body, the flow channel having an inlet opening formed in the channel body and an outlet opening formed in the channel body, the flow channel having an axis, the flow channel axis extending from the inlet opening to the outlet opening in a downstream direction and from the outlet opening to the inlet opening in a upstream direction. The flow channel axis defines radial directions emanating perpendicularly from the flow channel axis. The connector section comprises the outlet opening and is adapted and configured to removably connect to a piece of corrugated tubing. The clamp is operatively connected to the channel body and operative to clamp a fog nozzle housing. The method comprises clamping a fog nozzle housing so that an outlet end of the fog nozzle housing faces the flow channel, aligning an open end of the piece of corrugated tubing with the flow channel outlet opening, pushing the so aligned open end of the piece of corrugated tubing in the upstream direction into engagement with the connector section; and causing the fog machine to emit fog from the fog nozzle housing outlet end, to cause the fog emitted from the fog nozzle housing outlet end to flow through the flow channel inlet opening, through the flow channel, and from the flow channel through the flow channel outlet opening and into the fluid passage of the piece of corrugated tubing.

DETAILED DESCRIPTION

Described in this section is a nozzle adapter for connecting corrugated tubing to a fog nozzle housing of a fog machine of a type that heats a specialized liquid referred to as "fog juice," to atomize and/or vaporize the fog juice into an airborne vapor/mist mixture ("fog") emitted through a nozzle, which resembles fog or smoke. The nozzle is typically surrounded by a protective housing, which typically has a circular cylindrical wall and an outlet end face with openings to allow fog from the nozzle to flow out of the nozzle housing. In certain applications, such as for Halloween or other amusement props, the fog that flows out of the nozzle housing may be piped to a desired location through corrugated plastic tubing, such as common vacuum cleaner hose tubing or similar.

As shown in FIGS. 1-7, a fog nozzle adapter 10 comprises a channel body 12 and a clamp 14. The channel body 12 defines a flow channel 16 that extends through the channel body 12, the flow channel 16 having an inlet opening 18 formed in the channel body 12 and an outlet opening 20 formed in the channel body 12. The flow channel 16 has a flow channel axis X, the flow channel axis X defining radial directions R, which emanate perpendicularly from the flow channel axis X, and longitudinal directions, which extend along or parallel to the flow channel axis X. Thus, the flow channel axis X extends from the inlet opening 18 to the outlet opening 20 in a longitudinal downstream direction D, and from the outlet opening 20 to the inlet opening 18 in a longitudinal upstream direction U. The flow channel axis X of the fog nozzle adapter 10 is comprised in a straight line, but in other embodiments, a flow channel axis may deviate from a straight line. The flow channel 16 generally has circular cross sections perpendicular to the flow channel axis X. In other embodiments, a flow channel may have another cross-sectional shape or shapes.

The channel body 12 has a connector section 22, the outlet opening 20 being formed by the connector section 22. The connector section 22 is adapted and configured to removably connect to a piece of corrugated tubing $T_1$, $T_2$ having an open end, when the open end is aligned with the outlet opening 20 and the piece of corrugated tubing $T_1$, $T_2$ is pushed in the upstream direction into engagement with the connector section 22, as illustrated in a longitudinal cross section of the fog nozzle adapter 10, shown in FIG. 7.

More particularly, a connector section of a nozzle adapter according to the present disclosure includes a plurality of annular ridges of different diameters, operative to engage corresponding annular corrugated tubing grooves of different respective diameters. In the illustrated embodiment, the connector section 22 includes two annular ridges, namely, a first annular ridge 24 and a second annular ridge 26. In other embodiments, a connector section may include at least a third annular ridge. Each of the annular ridges 24, 26 surrounds a respective cross section 28, 30 of the flow channel 16, each being perpendicular to the axis X. The first annular ridge 24 has a first ridge diameter $D_1$, and the second annular ridge 26 has a second ridge diameter $D_2$, the first ridge diameter $D_1$ being smaller than the second ridge diameter $D_2$. Thus, the first annular ridge 24 is adapted and configured to snap fit into an annular corrugated tubing groove of approximately the first diameter $D_1$, the second annular ridge 26 being adapted and configured to snap fit into an annular corrugated tubing groove of approximately the second diameter $D_2$. The first annular ridge 24 is spaced from the second annular ridge 26 in the downstream direction D. Accordingly, a piece of corrugated tubing $T_1$ having a groove diameter $D_1$ can be connected to the connector section 22 by pushing an open end of the tubing $T_1$ past the first annular ridge 24 in the upstream direction to snap fit the annular ridge 24 into an annular groove $G_1$ of the tubing $T_1$, or piece of corrugated tubing $T_2$ having a groove diameter $D_2$ can be connected to the connector section 22 by pushing an open end of the tubing $T_2$ past the first annular ridge 24 in the upstream direction to snap fit the annular ridge 24 into an annular groove $G_2$ of the tubing $T_2$. In the illustrated embodiment, the annular ridges 24, 26 are external to the connector section 22, and the annular corrugated tubing grooves $G_1$, $G_2$ are external to the respective tubing $T_1$, $T_2$, so that snap fitting is attained by inserting the connector section 22 into the tubing $T_1$, $T_2$. In other embodiments, annular ridges may be internal to a connector section, for snap fitting into corresponding external annular grooves of a piece of corrugated tubing by inserting the tubing into the connector section. The channel body 12, including the connector section 22 and an inlet funnel 44 introduced below, is of a one-piece molded construction and is formed of a suitable moldable material, such as ABS plastic. In other embodiments, a channel body be integrally formed from multiple pieces.

Figure 1:
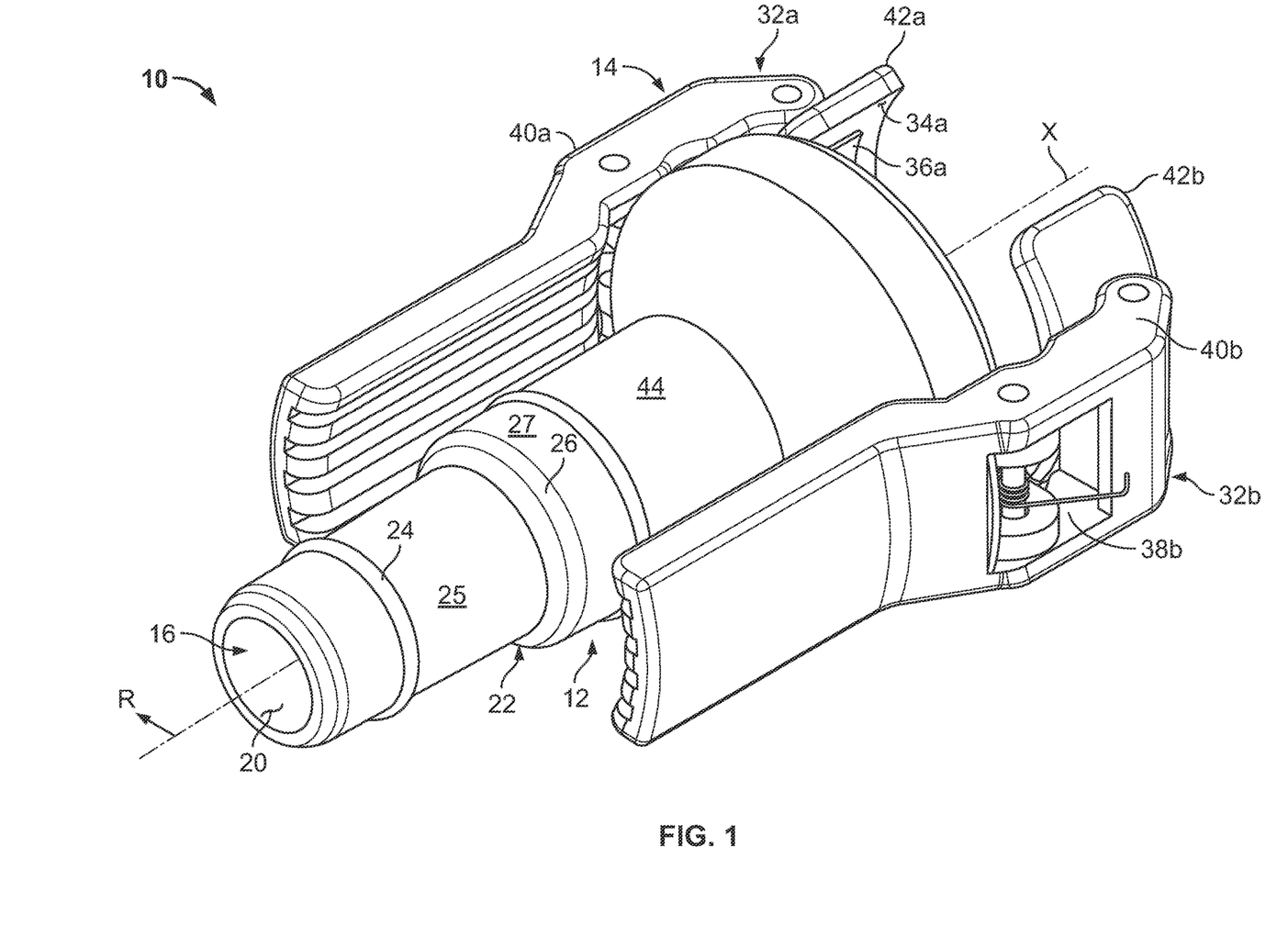
FIG. 1 is a downstream-lateral perspective view of a nozzle adapter according to the disclosure.
Figure 2:
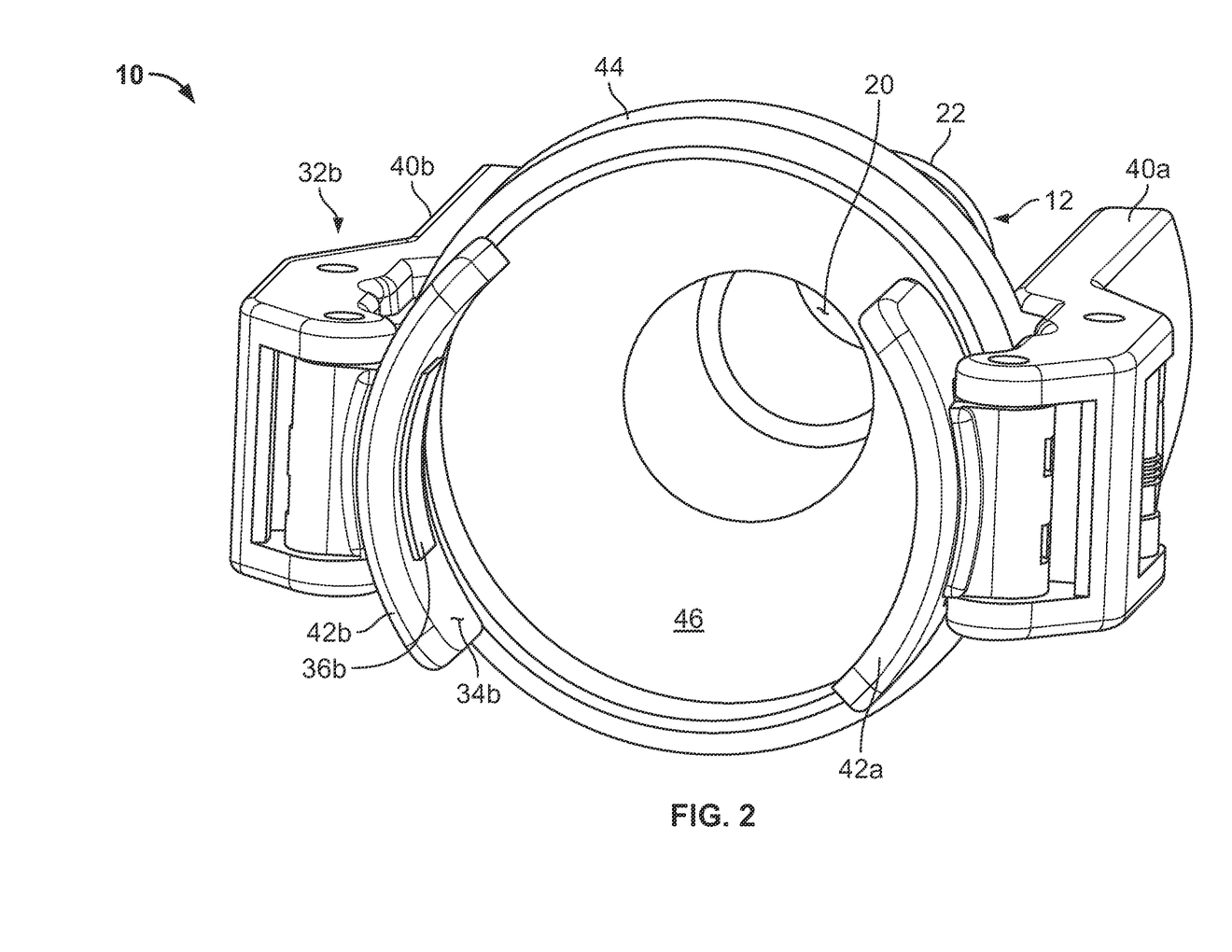
FIG. 2 is a slightly offset upstream end perspective view of the nozzle adapter shown in FIG. 1.
Figure 3:
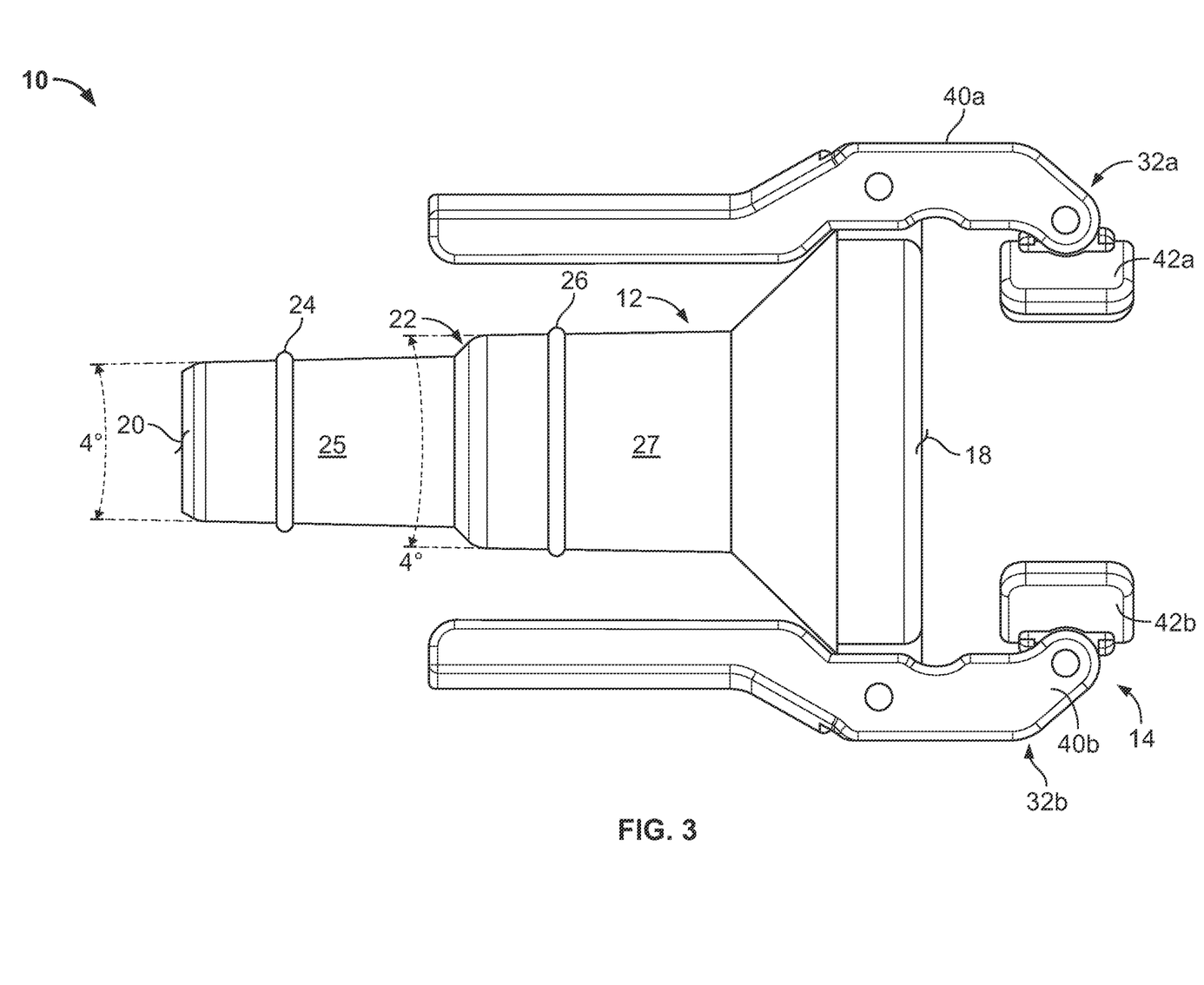
FIG. 3 is front elevation view of the nozzle adapter shown in FIG. 1.
Figure 4:
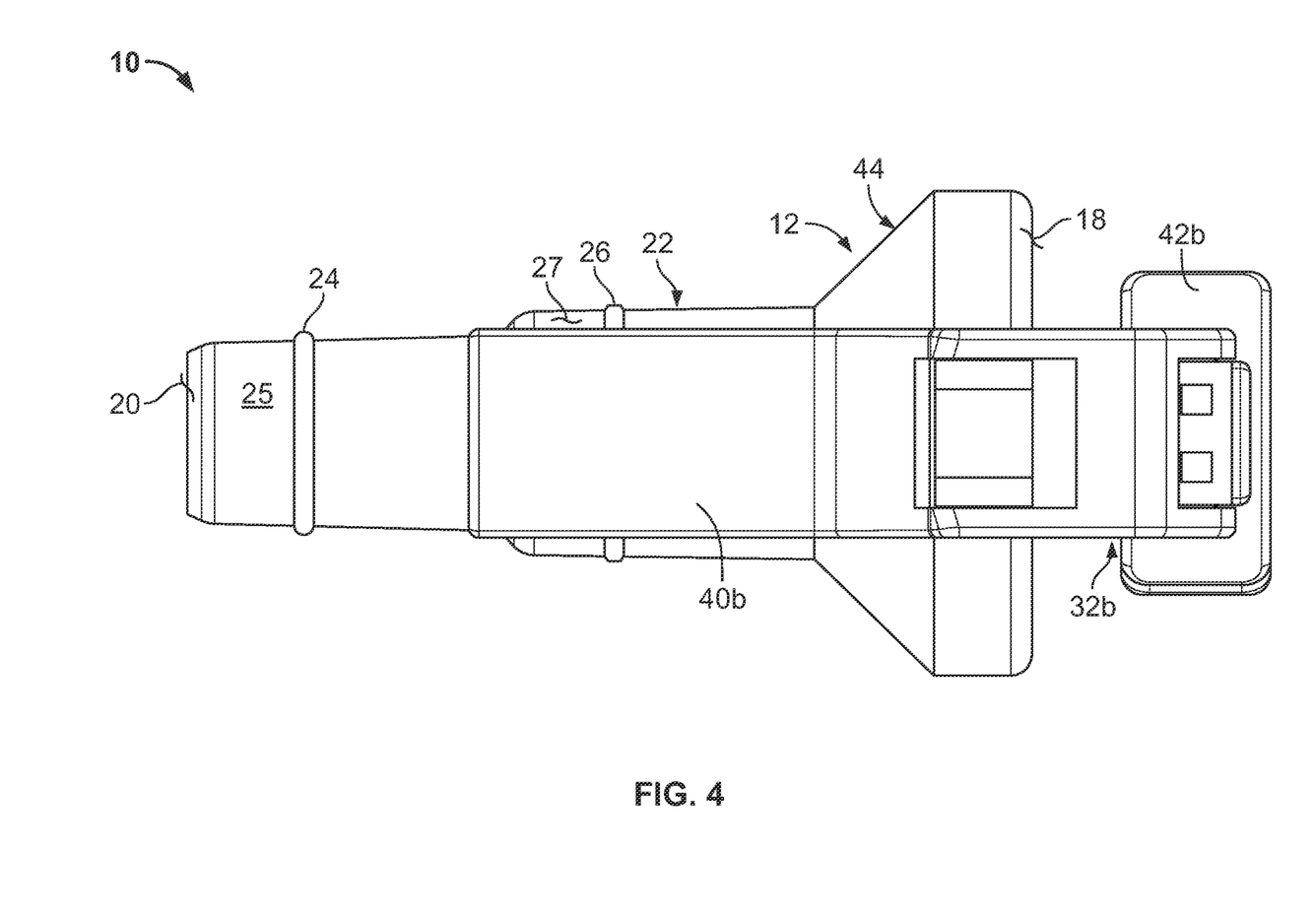
FIG. 4 is a lateral elevation view of the nozzle adapter shown in FIG. 1.
Figure 5:
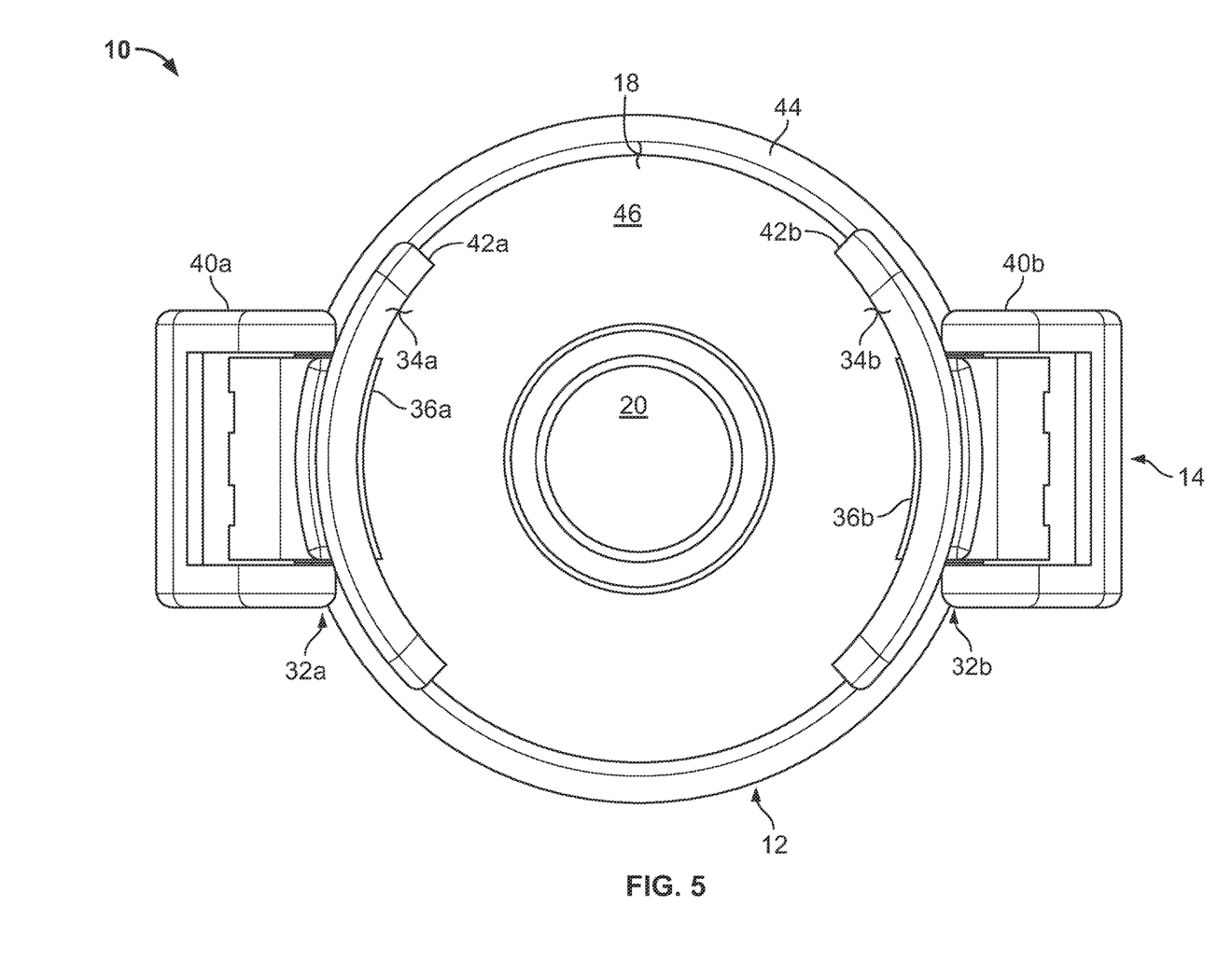
FIG. 5 is an upstream end plan view of the nozzle adapter shown in FIG. 1.
Figure 6:
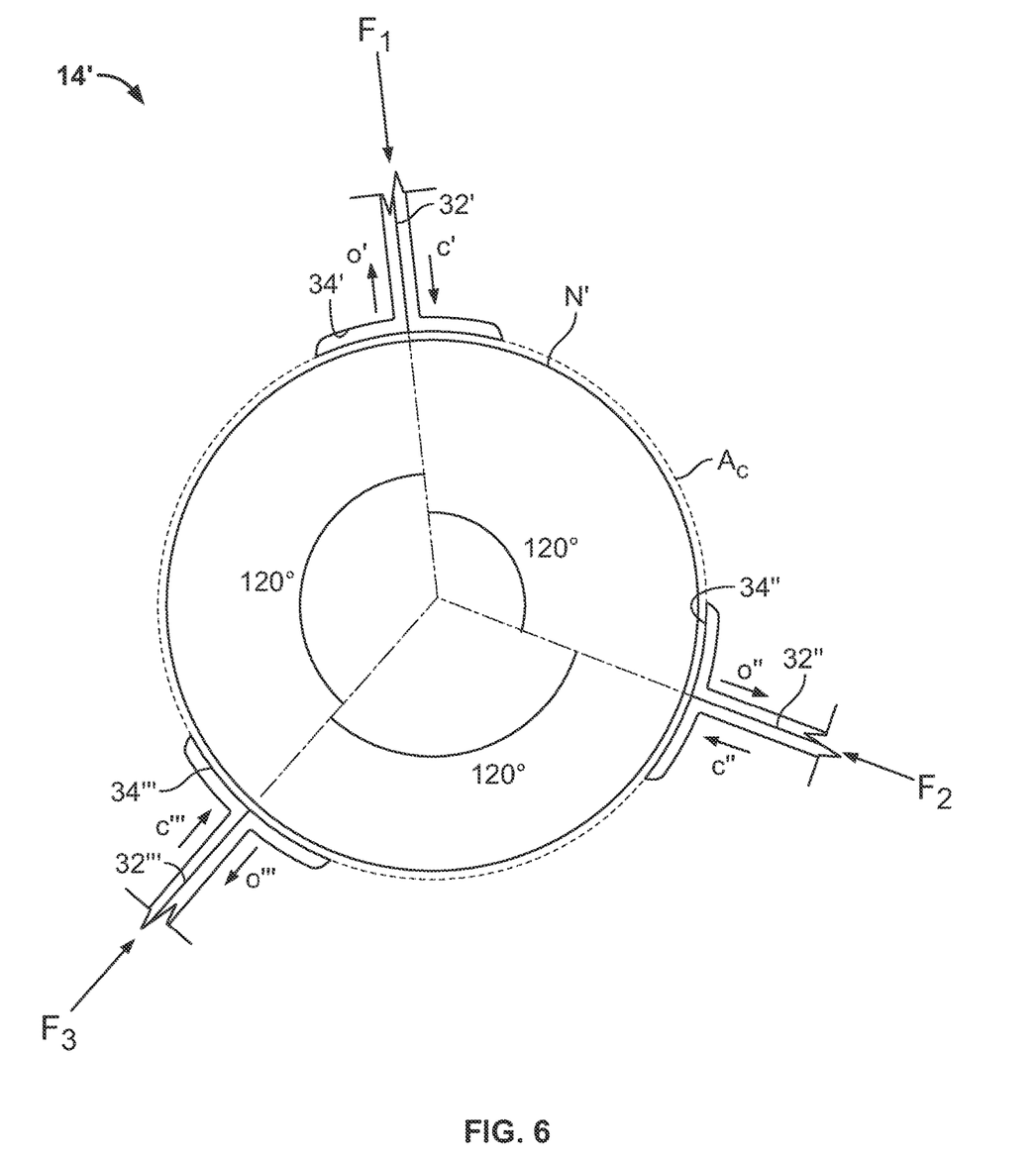
FIG. 6 is an upstream end plan schematic of a clamp for use in a nozzle adapter according to an embodiment.

The connector section 22 comprises a pair of stepped stages 25, 27, which in turn respectively comprise the respective annular ridges 24, 26. Each of the stages 25, 27 comprises an at least substantially cylindrical surface on which the respective annular ridge 24, 26 is formed. In the illustrated embodiment, the at least substantially cylindrical surfaces 25, 27 are conical surfaces, each having an aperture angle of about 4°, as indicated in FIG. 3. In embodiments, each of the at least substantially cylindrical surfaces opens at an angle no greater than about 5°. The diameters $D_1$ and $D_2$ may be, for example, slightly greater than ¾ inch (such as about 13/16 inch) and slightly greater than 1 inch (such as about 1 1/16 inch), respectively, to snap fit to corrugated plastic tubing of ¾-inch and 1-inch nominal diameters, respectively.

In embodiments, a connector section may comprise only a single stage with one corresponding annular ridge operative to snap fit to corrugated tubing of one desired diameter. In other embodiments, a connector section may comprise two or more stepped stages, each stage operative to connect to corrugated tubing of a desired diameter, the stages successively increasing in diameter in an upstream direction, the annular ridges corresponding to the stages may have diameters sized to snap-fit to other desired sizes of corrugated tubing. A largest-diameter annular ridge may for example, have a diameter slightly greater than 1½ inch (such as about 1 9/16 inch), and a smallest-diameter annular ridge may have a diameter slightly greater than ½ inch (such as about 9/16 inch), to snap fit to nominal 1½-inch and ½-inch corrugated tubing, respectively.

Turning back to the illustrated embodiment, a height of the first ridge 24, measured approximately radially and/or approximately normal to an adjacent point on the first stage surface 25 (i.e., about half the difference between the diameter $D_1$ and a diameter of the first stage surface 25 adjacent the first ridge 24), may for example be about 1/32 inch, or from about 1/64 inch to about 3/64 inch. A height of the second ridge 26, analogously measured to an adjacent point on the second stage surface 27, may be similar to the height of the first ridge 24.

Figure 7:
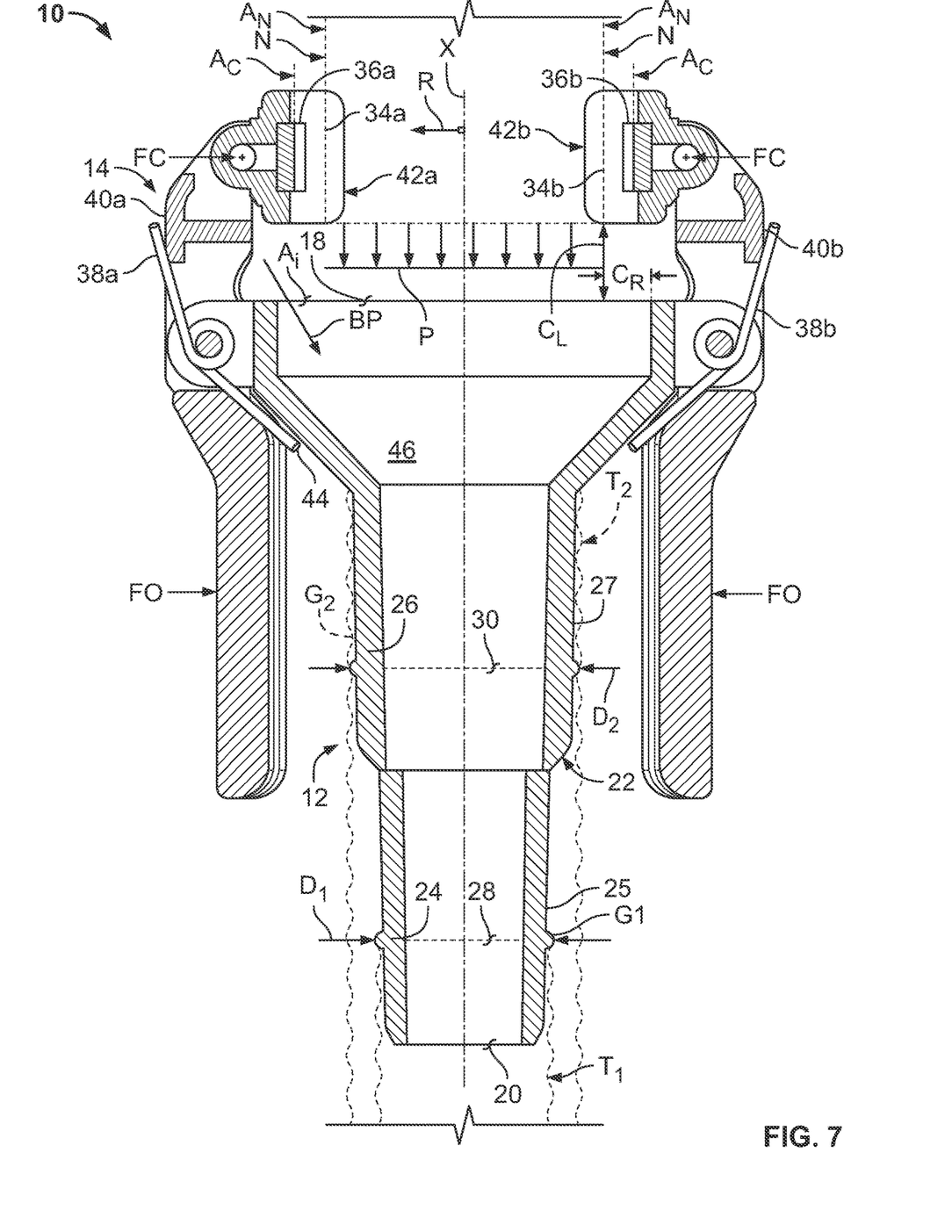
FIG. 7 is a front longitudinal sectional elevation view of the nozzle adapter shown in FIG. 1, illustrating a method of use.

As illustrated in FIG. 7, the clamp 14 is operatively connected to the channel body 12 so as to be operable to clamp a circular cylindrical fog nozzle housing N, so that an outlet end O of the fog nozzle housing N faces downstream toward the flow channel 16. That is, at least a portion of the channel 16 is disposed in a flow path P that extends downstream from the outlet end O. In addition, the clamp 14 is operable to clamp the fog nozzle housing N so that the fog nozzle housing N is spaced at a longitudinal clearance $C_L$ and/or a radial clearance $C_R$ from the channel body 12 to permit surrounding air to enter the flow path P via a bypass flow path BP and mix with fog emitted by the fog nozzle housing outlet end O, and the resulting mixture to flow through the fluid channel 16 and into a fluid passage of a piece of corrugated tubing, which is connected to the connector section 22 in a manner described below.

In alternative embodiments to the illustrated clamp 14, a fog nozzle adapter clamp may comprise any desired number of clamp elements. Thus, an alternative fog nozzle adapter clamp 14', depicted in an upstream-end schematic plan view in FIG. 6, comprises three clamp elements 32', 32", 32'", each clamp element 32', 32", 32'" being connected to a channel body (not shown) of a fog nozzle adapter. Each clamp element 32', 32", 32'" has a respective contact portion 34', 34", 34'", the contact portions 34', 34", 34'" circumscribing a circular clamp area $A_c$. The clamp elements 32', 32", 32'" are connected to the channel body so as to be independently movable toward and away from the clamp area $A_c$ in respective clamping and opening directions C' and O', C" and O", and C'" and O'", so as to contract and expand the clamp area $A_c$, respectively. In other embodiments, fewer than all but at least one of a plurality of clamp elements is movably connected to a channel body, and thus movable relative to such others of the clamp elements as may be fixedly connected to the channel body. In the fog nozzle adapter clamp 14', clamp elements 32', 32", 32'" are spaced apart circumferentially around the clamp area $A_c$ so that the respective clamping directions C' generally converge within the clamp area $A_c$ so as to stabilize a clamped object therein, such as the schematically illustrated fog nozzle housing N'. In addition, the ranges of motion of clamp elements 32', 32", 32'" and the shapes of their respective contact portions 34', 34", 34'" are adapted and configured to hold objects of a range of sizes and shapes. In particular, the three illustrated contact portions 34', 34", 34'" are evenly spaced apart at 120° from one another (any number X of contact portions of X corresponding clamp elements may likewise be spaced evenly at 360°/X from one another, or unevenly at suitable angles as desired), their concave curved shapes being adapted to conform to and clamp a circular cylindrical fog nozzle housing having a range of diameters. In embodiments, the clamp area faces downstream toward at least a portion of a flow channel formed by a channel body, and at least a first one of a plurality of clamp elements with respective contact portions is movable to move a respective first contact portion outwardly to expand a clamp area and inwardly to contract a clamp area.

In the fog nozzle adapter 10, as seen in the longitudinal cross-sectional view of FIG. 7, the clamp 14 comprises a pair of clamp elements 32a, 32b pivotally connected to opposite sides of the channel body 12, the clamp elements 32a, 32b comprising respective contact portions 34a, 34b. A clamp area denoted $A_c$ is circumscribed by the contact portions 34a, 34b, the clamp area $A_c$ facing downstream toward at least a portion of the flow channel 16. The relative range of motion of the contact portions 34a, 34b may be so as to provide a minimum clamp area $A_c$ that is about 1 inch in diameter and a maximum clamp area $A_c$ that is about 2 inches in diameter. In embodiments, the clamp 14 may be operative to provide a desired range of clamp area diameters for receiving a desired range of objects to be clamped. Each contact portion 34a, 34b comprises a respective grip pad 36a, 36b that faces the clamp area $A_c$, best seen in FIG. 1 (showing grip pad 36a only) and FIG. 5 (showing both grip pads 36a, 36b). The grip pads 36a, 36b are formed of a suitable heat resistant gripping material (e.g., silicone or other suitable rubber) and are attached to the corresponding clamp elements 32a, 32b in a suitable manner, such as by adhesive or overmolding. Other portions of each clamp element 32a, 32b may, for example, be molded from the same material as the channel body 12. The heat resistant gripping material of the grip pads 36a, 36b may advantageously be resiliently compressible, to conform to the peripheries of fog nozzle housings of different sizes and/or shapes through repeated uses, as in the case of silicone, thus enhancing stability and holding friction of the clamp 14. Heat resistance allows the grip pads 36a, 36b to withstand sustained high temperatures typical of a fog nozzle housing and/or of the emitted fog stream in a region adjacent a fog nozzle housing outlet of a fog machine. The temperature of a fog machine fog nozzle itself, disposed centrally within a fog nozzle housing, may reach as high as about 300° C. (572° F.), resulting in significantly elevated temperatures of the housing periphery.

A clamp of a nozzle adapter according to the present disclosure comprises at least one biasing element to bias at least one of a plurality of clamp elements in a clamping direction and may, for example, comprise a separate biasing element for each of a plurality of clamp elements. Suitable biasing elements may be, for example, helical torsion springs, operative to transmit a biasing torque between a clamp element and a channel body. In the illustrated embodiment, the clamp 14 comprises a first clamp spring 38a corresponding to the first clamp element 32a and a second clamp spring 38b corresponding to the second clamp element 32b. The clamp springs 38a, 38b are operatively connected between the channel body 12 and the respective clamp elements 32a, 32b to bias the respective contact portions 34a, 34b to rotate inwardly relative to the channel body 12, so as to transmit a clamping force FC to a clamped object through the contact portions 34a, 34b.

Generally, a biasing element of a fog nozzle adapter clamp according to the disclosure, may be preloaded so as to provide a substantially constant clamping force throughout an active range of motion of the biasing element, or so as to provide a clamping force that varies significantly throughout the active range of motion of the biasing element. For example, the clamping force may generally increase as the clamp is opened to expand the clamp area. A clamping force produced when the clamp is opened wide enough to receive a fog nozzle housing should be large enough to keep a fog nozzle adapter clamped to the fog nozzle housing in a desired position under conditions of normal use, while a corresponding opening force required to oppose the clamping force so as to receive the nozzle housing to be clamped in the clamp area should be small enough to be comfortably applied by hand. More preferably, the opening force required to fully open the clamp to a maximum clamp area is also small enough to be comfortably applied by hand. In some modes of use of a fog nozzle adapter according to methods disclosed herein, the fog nozzle adapter is connected to a fog nozzle housing of a fog machine that rests on a horizontal support surface, any slack portion of a piece of corrugated tubing connected rests on the same support surface as the fog machine, and the piece of tubing is generally not expected to be disturbed.

In such modes of use of the illustrated fog nozzle adapter 10, the clamping force FC applied to an approximately 1.5-inch diameter cylindrical fog nozzle housing N may, for example, be from about 3-7 lbf, more particularly about 4-6 lbf, or still more particularly about 5 lbf. In an embodiment of the fog nozzle adapter 10, a maximum clamping force produced when the clamp 14 is fully opened to an approximately 2-inch diameter maximum clamp area (not shown) is from about 7-15 lbf, more particularly about 9-13 lbf, or still more particularly about 11 lbf. In other embodiments, the clamp springs 38a, 38b may be preloaded and connected in such a manner that the maximum clamping force is substantially the same as the clamping force FC. In other modes of use in which a connector section of an adapter may be subjected to more significant pulling and/or bending forces from the tubing, greater clamping forces may be desired to keep the adapter in a desired position during use.

Each illustrated clamp element 32a, 32b comprises a respective clamp arm 40a, 40b and a respective clamp grip 42a, 42b. The clamp grips 42a, 42b comprise the respective contact portions 34a, 34b and are pivotally connected to the clamp arms 40a, 40b for pivotal movement about respective clamp grip pivot axes. The clamp arms 40a, 40b, in turn, are pivotally connected to the channel body 12 about respective clamp arm pivot axes, each clamp arm pivot axis being parallel to the clamp grip pivot axis of the corresponding clamp element 32a, 32b. The clamp arm 32a, 32b is biased about the clamp arm pivot axis so as to move the respective clamp grip pivot axis inwardly. This in turn biases the respective clamp grips 42a, 42b inwardly, including the first contact portions 34a, 34b which bear the respective grip pads 36a, 36b. The clamp grips 42a, 42b being pivotally connected to the clamp arms 40a, 40b advantageously permits the grip pads 36a, 36b to settle into flush alignment with a fog nozzle housing N, so as to enhance grip traction and stability of the clamp 14.

Illustrated in FIG. 7 is an example of the use of clamp 14 to clamp an outlet end portion of a circular cylindrical fog nozzle housing N. An opening force FO opposing the clamping force FC is applied to at least one of the clamp elements 32a, 32b, so as to move the respective contact portion 34a, 34b (specifically the grip pads 36a, 36b) outwardly to expand the clamp area $A_c$ to receive the inserted fog nozzle outlet end, and the nozzle outlet end is positioned to extend through the clamp area in the downstream direction, such as by advancing the clamp 14 toward and over the fog nozzle housing N in the upstream direction, so that the fog nozzle housing N is inserted through the clamp area $A_c$ in the downstream direction. The opening force FO is then removed to permit at least one of the contact portions 34a, 34b to move inwardly under the clamping force FC to contract the clamp area $A_c$ until the clamp area $A_c$ circumscribes a cross-sectional nozzle housing area AN of the fog nozzle housing N, thus to clamp the fog nozzle housing N in the clamp area $A_c$ between at least the first contact portion 34a and the second contact portion 34b. In embodiments having more than two clamp elements, at least two but fewer than all of the respective contact portions may contact a clamped nozzle, for example, when a clamped nozzle housing has cross-sectional shape that is unusual for a type of nozzle housing for which the clamp is normally used.

Turning back to the structure of the channel body 12, the flow channel inlet opening 18 has an area $A_i$ perpendicular to the flow channel axis X, as indicated in FIG. 7. The inlet opening area $A_i$ is larger than that of each of the respective flow channel cross sections 28, 30. For example, the flow channel inlet opening 18 may be a circular area approximately 2 inches in diameter, while the flow channel cross sections 28, 30 may be circular cross sections having diameters of approximately ⅝ inch and ⅞ inch, respectively. An inlet opening having a larger area than a farther downstream section of a flow channel permits the inlet opening to align with the entirety of a nozzle opening that has a larger area than the farther downstream flow channel section. This allows a fog nozzle adapter according to this disclosure to channel a nozzle outflow into corrugated plastic tubing of a flow cross-section smaller than that of the nozzle outflow.

In the illustrated embodiment, the channel body 12 has a tapered inlet funnel 44 defining an inlet portion 46 of the flow channel that comprises the inlet opening 18, the inlet portion 46 being bounded peripherally by a conical outer surface that is tapered inwardly in the downstream direction from the inlet opening 18. As illustrated in FIG. 7, a nozzle housing N clamped by the clamp 14 is spaced from a periphery of the inlet opening 18 by the longitudinal clearance $C_L$ and the radial clearance $C_R$.

While the disclosed subject matter has been described with reference to certain embodiments, it is to be understood that the scope of the disclosed subject matter is capable of numerous changes, modifications and rearrangements, and such changes, modifications and rearrangements are intended to be covered by the following claims. In addition, although narrow claims may be presented below, it should be recognized that the scope of the disclosed subject matter is broader than presented by the claim(s). It is intended that broader claims may be submitted in one or more applications that claim the benefit of priority from this application. Insofar as the description above and the accompanying drawings disclose additional subject matter that is not within the scope of the claim or claims below, the additional subject matter is not dedicated to the public and the right to file one or more applications to claim such additional subject matter is reserved.

What is claimed is:

1. A nozzle adapter for connecting corrugated tubing to a fog nozzle housing, the nozzle adapter comprising:

a channel body, the channel body defining a flow channel that extends through the channel body, the flow channel having an inlet opening formed in the channel body and an outlet opening formed in the channel body, the flow channel having an axis, the flow channel axis extending from the inlet opening to the outlet opening in a downstream direction and from the outlet opening to the inlet opening in a upstream direction, the flow channel axis defining longitudinal directions parallel to the flow channel axis and radial directions emanating perpendicularly from the flow channel axis;

the channel body having a connector section, the outlet opening being comprised in the connector section, the connector section being adapted and configured to removably connect to a piece of corrugated tubing when an open end of the corrugated tubing is aligned with the outlet opening and the piece of corrugated tubing is pushed in the upstream direction into engagement with the connector section;

a clamp, the clamp being operatively connected to the channel body and operable to clamp a fog nozzle housing so that an outlet end of the fog nozzle housing faces downstream toward the flow channel;

the clamp comprising a plurality of clamp elements, each clamp element being connected to the channel body, each clamp element having a respective contact portion, the contact portions circumscribing a circular clamp area, at least a portion of the flow channel inlet opening facing upstream toward the clamp area, at least a first one of the clamp elements being movable to move the respective first contact portion outwardly to expand the clamp area, to permit an outlet end portion of the fog nozzle housing, the fog nozzle housing outlet end portion comprising the fog nozzle housing outlet end, to be inserted through the clamp area in the downstream direction, and to move the respective first contact portion inwardly to contract the clamp area, to clamp the fog nozzle housing outlet end portion in the clamp area between at least the first contact portion and a respective second contact portion of a second one of the clamp elements;

the clamp comprising at least one biasing member, the biasing member being operatively connected to the first clamp element to provide a clamping force to bias the first contact portion inwardly, such that, when an opening force opposing the clamping force is applied to the first clamp element, to move the first clamp element so as to move the first contact portion outwardly to expand the clamp area to receive the inserted fog nozzle housing outlet end, when the nozzle housing outlet end is inserted through the clamp area in the downstream direction, and when the opening force is removed from the first clamp element, the nozzle housing outlet end is clamped between at least the first contact portion and the second contact portion.

2. The nozzle adapter of claim 1, further comprising the clamp being operable to clamp the fog nozzle housing so that the channel body is spaced from the fog nozzle housing by a clearance, to permit a mixture of surrounding air and fog emitted from the fog nozzle housing outlet end to flow into the flow channel.

3. The nozzle adapter of claim 1, wherein the flow channel axis is comprised in a straight line.

4. The nozzle adapter of claim 1 wherein the channel body is of one-piece molded construction.

5. The nozzle adapter of claim 1 wherein the first clamp element is pivotally connected to the channel body.

6. The nozzle adapter of claim 5 wherein the first clamp element comprises a clamp arm and a clamp grip, the clamp grip comprising the first contact portion and being pivotally connected to the clamp arm for pivotal movement about a clamp grip pivot axis, the clamp arm being pivotally connected to the channel body about a clamp arm pivot axis parallel to the clamp grip pivot axis, the clamp arm being biased about the clamp arm pivot axis so as to move the clamp grip pivot axis inwardly, so as to move the first contact portion inwardly.

7. The nozzle adapter of claim 1, the contact portions comprising a resilient and heat resistant grip material.

8. The nozzle adapter of claim 1, the channel body having an inlet funnel defining an inlet portion of the flow channel comprising the inlet opening, the inlet portion being tapered inwardly in the downstream direction from the inlet opening.

\* \* \* \* \*